United States Patent [19]

Moritz

[11] 4,084,370
[45] Apr. 18, 1978

[54] APPARATUS FOR FASTENING A COVERING ON AN ENERGY CONDUCTING CHAIN

[75] Inventor: Werner Moritz, Siegen, Germany

[73] Assignee: Kabelschlepp Gesellschaft mit beschrankter Haftung, Siegen, Germany

[21] Appl. No.: 811,611

[22] Filed: Jun. 30, 1977

[30] Foreign Application Priority Data

Aug. 5, 1976 Germany .................. 7624583[U]

[51] Int. Cl.² ............................................. F16G 13/16
[52] U.S. Cl. ............................................ 59/78.1; 248/49
[58] Field of Search .................. 59/78.1; 248/49, 51, 248/52, 68 R, 58

[56] References Cited

U.S. PATENT DOCUMENTS

| 3,197,954 | 8/1965 | Merker | 59/78.1 |
| 3,330,105 | 7/1967 | Weber | 59/78.1 |
| 3,382,668 | 5/1968 | Berkes | 59/78.1 |
| 3,770,022 | 11/1973 | Beisemann | 248/51 |
| 3,848,407 | 11/1974 | Moritz | 59/78.1 |
| 4,046,343 | 9/1977 | Kambara | 248/49 |

FOREIGN PATENT DOCUMENTS 288,545  3/1964  Netherlands ........................ 248/49

*Primary Examiner*—C.W. Lanham
*Assistant Examiner*—Gene P. Crosby
*Attorney, Agent, or Firm*—Martin A. Farber

[57] ABSTRACT

An apparatus for fastening of a covering made of steel band or the like on an energy conducting chain, the latter formed of two link chains, and one-piece webs or several piece webs connecting the latter with one another. Each web has on its upper belt and lower belt lateral grooves. Hooks are provided with lateral clamps engaging in the lateral grooves for fastening of the steel band.

6 Claims, 3 Drawing Figures

APPARATUS FOR FASTENING A COVERING ON AN ENERGY CONDUCTING CHAIN

The invention relates to an apparatus for fastening of a covering made of a steel band or the like on an energy conducting chain, the latter being formed of two link articulation chains and webs connecting the latter with one another.

Energy conducting chains are known with a covering made of a steel band, which energy conducting chains are formed from two link chains and stays connecting the latter with one another (Great Britain Pat. No. 1,121,178). With these known energy conducting chains, the steel band is pulled in between the webs and rods arranged spaced a distance over that. The apparatus for securing the covering thus comprises the webs and the rods, which are separately produced, and which also must be connected with the brackets of both of the link articulation chains.

The present invention is based on the object of producing an apparatus for fastening of the covering made of a steel band, which can be simply produced and assembled.

It is another object of the present invention to aid the solution of the above-mentioned object in the manner that each stay or web on its upper belt and lower belt has lateral grooves and that hook members for the fastening of the steel band engage in the grooves, the hook members being provided with lateral clamps for the engagement in the grooves. In a preferred embodiment, the hook members are made of spring steel or plastic synthetic material.

An apparatus constructed in accordance with the present invention for fastening of a covering made of steel band has the advantage that the stays only must still be connected with the brackets of the lateral hinge articulation chains and the steel band can be pulled-in still later in the hook members, the latter being secured on the stays. Moreover with very wide energy conducting chains it is possible to assemble the covering from a plurality of steel bands which are arranged adjacent one another, which steel bands are secured with the hooks in their parallel position.

With the above and other objects and advantages in view, the present invention will become more clearly understood in connection with the following detailed description of a preferred embodiment, when considered with the accompanying drawing, of which:

Figure 1:
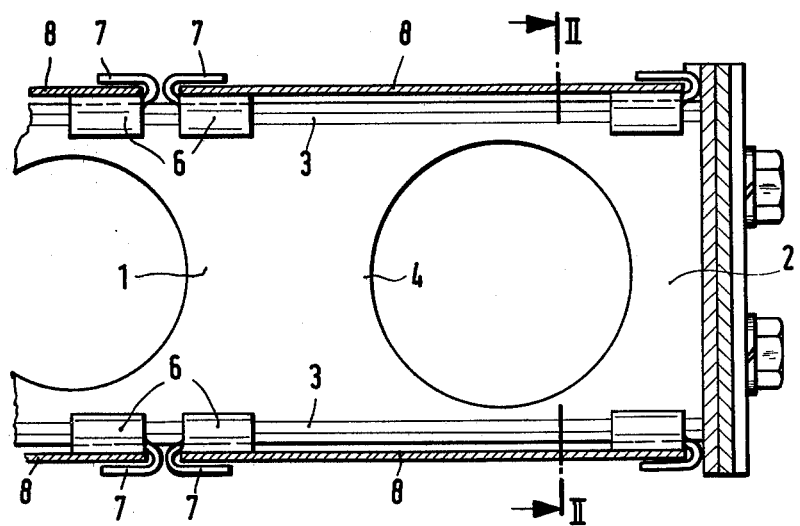
FIG. 1 is a side view of a section of one web in accordance with the present invention.
Figure 3:
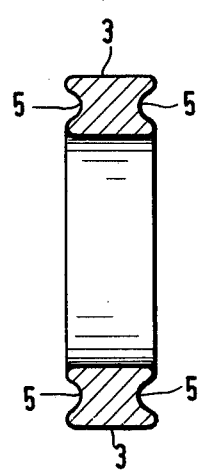
FIG. 3 is a view similar to FIG. 2 of the same web without hooks and covering.

Referring now to the drawing, in accordance with the present invention, a web 1 is formed from lateral legs 2 and upper and lower belts 3 which are connected with the latter. The legs 2 and the belts 3 can frame a single opening 4 for drawing an energy conductor or transmission line (not shown) therein; it is yet also possible to form in the surface of the stay or web 1, which stay is constructed of one integral piece or of several parts, a pluraity of adjacent openings 4 for several energy conductors or transmission lines.

Lateral grooves 5 are arranged in the belts 3 of the web or stay 1, in which grooves 5, clasps or hook members 7 for the fastening of a steel band 8 can be snap-engaged therein, the latter serving as a covering, and the hook members being provided with lateral clamps 6 therefor.

With very wide webs 1, a plurality of steel bands 8 can be arranged adjacent one another and can be held fixed in their parallel position with the hooks 7.

Figure 2:
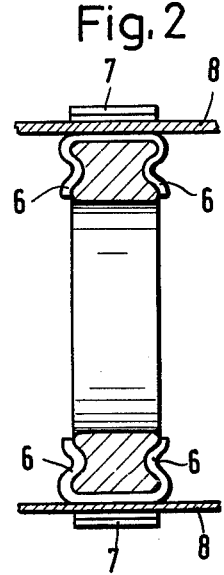
FIG. 2 is a section of the same web taken along the lines II—II of FIG. 1.

As illustrated in FIG. 2 the holding clamps 6 preferably are formed with inwardly directed curved portions, such as the peaks of planar symmetrical waves narrowing toward each other at their centers and complementary in shape to the corresponding lateral grooves or channels 5 in the respective belts 3. The opposite legs of each clamp, which substantially form a U-shape in cross-section, in the non-fastened or detached condition are spaced apart from one another by a distance smaller than the width or distance between the opposite recesses 5 of the corresponding belt 3. The clamp 6 is made of spring steel or synthetic material which is resilient and therefore when inserted in a groove 5 spreads, but having an inwardly clamping retaining force, holds onto the belts 3.

While I have disclosed at least one embodiment of the invention, it is to be understood that this embodiment is given by example only and not in a limiting sense.

I claim:

1. An apparatus for fastening a cover made of steel band or the like on an energy conducting chain, the latter being formed of two link chains and webs of at least one piece connecting the latter with one another, comprising
    a web having an upper belt and a lower belt,
    said upper belt and said lower belt each being formed with lateral grooves,
    clasp means for securing a steel band therein, respectively, said clasp means including lateral clamps cooperating with said grooves, said clasp means engaging in said grooves.

2. The apparatus according to claim 1 wherein said clasp means and said clamps are integrally formed of spring steel.

3. The apparatus according to claim 1, wherein said clasp means and said clamps are integrally formed of synthetic material.

4. The apparatus according to claim 1, wherein said clasp means are hooks.

5. The apparatus according to claim 1, wherein said clamps are resiliently formed and include inwardly directed peaks substantially complementary to the shape of said lateral grooves, said grooves are on opposite lateral sides of said belts, respectively, whereby a secure fastening of said clasp means and said clamps on said belts is achieved in an engaged position.

6. The apparatus according to claim 4, wherein said clamps form inwardly directed curved portions.

* * * * *